Patented Oct. 25, 1927.

1,646,731

UNITED STATES PATENT OFFICE.

CLAUDE S. HUDSON, OF TRENTON, NEW JERSEY, ASSIGNOR TO STANDARD DEVELOPMENT COMPANY, A CORPORATION OF DELAWARE.

GLAZING COMPOSITION.

No Drawing. Application filed August 19, 1921. Serial No. 493,690.

My invention relates to an improved glazing composition, and will be understood from the following specification.

It has been found advantageous to coat certain kinds and grades of candy with a thin film or coating of a substance that will prevent the absorption of moisture by the candy and thereby prevent not only its becoming sticky and inconvenient to handle, but also prevent its deterioration. This is best accomplished by making a solution of such gums and resins as are soluble in a suitable solvent but insoluble in water, and applying the solution to the candy as by dipping or otherwise. The solvent is then allowed to evaporate so as to leave a thin coating of glaze on the candy.

I have found that it is preferable in preparing a solution of this kind to use iso-propyl alcohol rather than ethyl, methyl, or any other alcohol because of the higher solvent power of iso-propyl alcohol for the gums and resins which are best adapted for this purpose. The use of iso-propyl alcohol is further advantageous on account of the fact that sugar is less soluble in iso-propyl alcohol than it is in such alcohols as ethyl or methyl alcohol of commercial grades. It is therefore apparent that the sugar of the candy will have less tendency to partially dissolve when the glazing solution is applied and thereby the candy become sticky and slow to dry, when iso-propyl alcohol is used than when other alcohols are used.

My improved glazing composition is prepared by dissolving a spirit-soluble gum, for example, shellac (sometimes known as lac), copal or accroide, or a mixture of such spirit-soluble gums in iso-propyl alcohol. This solution is then applied to the candy and the solvent allowed to evaporate.

The following specific example of the preparation of my glaze composition is given:

To each gallon of iso-propyl alcohol of approximately 91% by volume are added three pounds of shellac (lac) free from pigments containing arsenic. The specific gravity of alcohol of this grade is approximately .78 and a gallon therefore weighs from six to seven pounds. The mixture is allowed to stand with occasional agitation or stirring for several hours, say for twelve hours, until solution is effected.

The solution is allowed to stand for a short time after the last agitation until any sediment which may be present settles to the bottom. It is preferably allowed to stand over night. The solution is then decanted and is ready for use.

It will be understood that while I have referred to the use of iso-propyl alcohol of about 91% by volume, iso-propyl alcohol of different strengths or percentages may be used. The proportions of iso-propyl alcohol and the gum or mixture of gums may also be varied as desired.

I claim:

1. A glaze composition for glazing candy comprising approximately three parts by weight of a spirit-soluble gum dissolved in approximately six to seven parts by weight of iso-propyl alcohol.

2. A glaze composition for glazing candy comprising approximately three parts of a spirit-soluble gum dissolved in six to seven parts of iso-propyl alcohol of approximately 91% by volume.

3. A glaze composition for glazing candy comprising approximately three parts by weight of shellac (lac) dissolved in approximately six to seven parts of iso-propyl alcohol of approximately 91% by volume.

CLAUDE S. HUDSON.